(No Model.)
H. BORSCH.
NOSE PIECE FOR EYEGLASSES.
No. 541,961. Patented July 2, 1895.
Fig. 1.
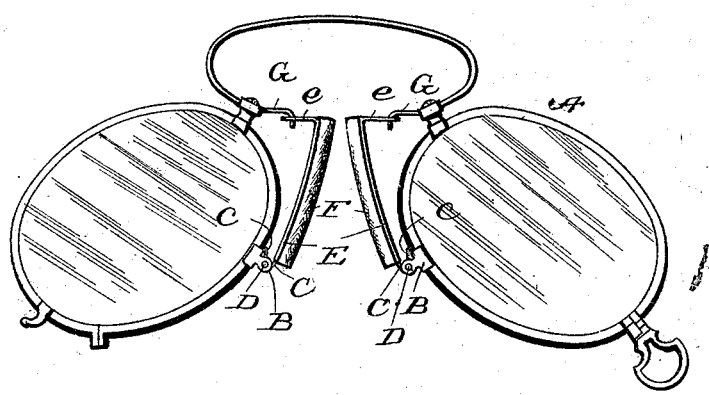
Fig. 2.
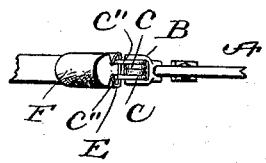
Fig. 4.   Fig. 3.   Fig. 5.
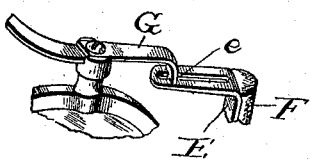 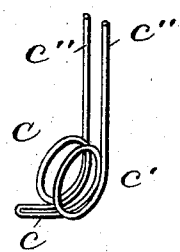 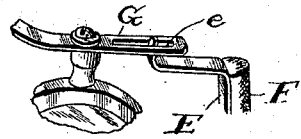
Witnesses
Inventor
Henry Borsch
By T. J. W. Robertson
Attorney

UNITED STATES PATENT OFFICE.

HENRY BORSCH, OF CHICAGO, ILLINOIS.

NOSE-PIECE FOR EYEGLASSES.

SPECIFICATION forming part of Letters Patent No. 541,961, dated July 2, 1895.

Application filed May 5, 1894. Serial No. 510,190. (No model.)

*To all whom it may concern:*

Be it known that I, HENRY BORSCH, a citizen of the United States, residing at Chicago, in the county of Cook, Illinois, have invented certain new and useful Improvements in Nose-Pieces for Eyeglasses, of which the following is a specification, reference being had therein to the accompanying drawings.

This invention is designed to provide a nose-piece for eye glasses of that class in which one end is attached to the rim of the lens, while the other end is free to move toward or from the lens, and it consists in the improvement hereinafter described and then definitely claimed at the end hereof.

In the accompanying drawings, Figure 1 is an elevation, on a large scale, of a pair of glasses constructed according to my improvement. Fig. 2 is a reversed plan of the connection between the rim and the nose-piece on a still larger scale. Fig. 3 is a perspective detail on a yet larger scale than Fig. 2, showing a spring detached. Fig. 4 is a similar view of the connection between the top of the nose-piece and the bridge. Fig. 5 is a similar view of a modified form of the connection between the nose-piece and bridge.

Referring now to the details of the drawings by letter. A represents the rim which may be of any suitable form, but should be provided with ears B which receive the coils of a spring C, said spring being secured therein by a pin D. This spring is formed of wire bent into a loop *c* in the center, and having coils *c'* at each side which terminate in the ends *c''*. These ends are set into the metallic back E of the nose-piece which holds the cork or rubber cushion F, while the loop *c* bears against the rim of the lens. The upper end *e* of the metallic back of the nose piece is curved backward and is slotted to receive the end of an arm G attached to the socket of the bridge as shown in Fig. 4, or the bridge may be extended at the ends so as to form arms to engage with the upper ends of the nose pieces, as shown in Fig. 5. By this construction eyeglasses are made in which the nose pieces have a very elastic pressure on the nose and are yet very durable, while heretofore the nose pieces in this class of eye glasses were either not sufficiently elastic or not strong enough for ordinary use, and were thus easily broken.

The use of the double coil spring will be found very advantageous, inasmuch as while the coils will admit of perfect freedom of motion to and from the nose, there will be found but comparatively little motion toward or from the eye, owing to the double connection between the frame and the nose piece.

What I claim as new is—

1. The combination in an eye-glass, of the metallic back E and the cushion F, with a spring C, having its upper portion inclosed between the back and the cushion, its lower portion connected to the rim of the lens, and a double coil between the cushion and lens, whereby great freedom of motion is allowed in one direction and comparatively little in the other, substantially as described.

2. The combination in an eye-glass and with a nose-piece having a metallic back and cushion, of the rim A having ears B, a coiled spring C set in the ears and secured by a pin D, said spring having a central loop bearing against the rim and its upper portion passing inside the metallic back at each side of the cushion, all substantially as shown and described.

In testimony whereof I affix my signature, in presence of two witnesses, this 27th day of April, 1894.

HENRY BORSCH.

Witnesses:
CHAS. S. WEYHMAN,
C. GILKEY.